United States Patent Office 2,952,670
Patented Sept. 13, 1960

2,952,670

POLYMERIZATION AND CATALYST THEREFOR

Rudolph F. Fischer, Oakland, Calif., assignor to Shell Oil Company, New York, N.Y., a corporation of Delaware No Drawing. Filed Aug. 26, 1957, Ser. No. 680,401

16 Claims. (Cl. 260—93.5)

This invention relates to the low pressure polymerization of alpha-olefins. More particularly, it relates to novel low pressure catalyst and to improvements in the method of polymerizing alpha-olefins therewith.

It is now known that alpha-olefins may be polymerized at low temperatures and low pressures by the employment of catalysts which are capable of effecting polymerization at low temperatures and pressures. These catalysts are designated in the art generally as "low pressure" catalysts and the processes whereby alpha-olefins are polymerized using low pressure catalysts are termed "low pressure processes." The low pressure processes for the polymerization of alpha-olefins comprise polymerization at temperatures ranging from room temperature to about 150° C. and pressures ranging from atmospheric pressure to about 500 p.s.i. Briefly, low pressure catalysts are believed to be complexes of aluminum alkyls, or organo-aluminum compounds, and metal halides wherein the metal may be selected from groups IV through VI of the periodic table. Such halides include, for example, titanium tetrachloride, zirconium tetrachloride, and the like.

It has now been found that polymerization of alpha-olefins using the low pressure processes may be advantageously conducted with the novel polymerization catalysts of this invention.

It is an object of this invention to provide novel catalysts which are useful for the polymerization of alpha-olefins. It is another object of this invention to provide novel metallo-organic catalysts which are useful for the polymerization of alpha-olefins. It is yet another object of this invention to provide low pressure catalysts of organo-aluminum and certain organo-titanium compounds. It is yet another object of this invention to provide improved processes for the polymerization of alpha-olefins employing the new polymerization catalysts. Other objects will become apparent as the description of the invention proceeds.

These and other objects are accomplished by a catalyst of an aluminum alkyl and a cyclopentadienyl titanium compound selected from the group consisting of bis(cyclopentadienyl)titanium dichloride, diphenyl bis(cyclopentadienyl)titanium and mixtures thereof. The aluminum alkyl referred to above may be selected from any of the presently known aluminum alkyls which are employed in the low pressure polymerization processes. They include, for example, aluminum trimethyl, aluminum triethyl, diethyl aluminum chloride, diethyl aluminum bromide, aluminum triisobutyl, aluminum tributyl, and the like. If desired, the alkyl of the aluminum alkyl may contain up to 10 carbon atoms but it is preferred that the alkyl radicals have from 1 to 4 carbon atoms.

It is an advantage of this invention that the catalyst is simply prepared by bringing together the catalyst components in the presence of a hydrocarbon solvent. Representative solvents include, for example, benzene, toluene, xylene, cyclohexane, isooctane, pentane, and the like. The preparation of the catalyst does not require the employment of elevated temperatures since it is found that the catalyst composition does not necessarily involve the formation of a complex, or reaction product. If desired, however, temperatures in the order of 60° may be employed while mixing the catalyst components but it will be found that the employment of elevated temperatures is unnecessary.

An outstanding advantage of this invention is that substantially higher yields per unit of catalyst are obtained. This is because the titanium compound is not totally consumed during the polymerization and large portions of it may be recovered and reused. This will be recognized as a substantial improvement over prior art low pressure methods wherein the catalyst components are consumed. This consumption of the catalyst in prior low pressure polymerization methods is one of the major disadvantages which this invention overcomes. While this invention is in no way limited by theoretical considerations, it is believed that the catalyst components of this invention do not form complexes and that the titanium compound acts as a true promoter for the aluminum compound. It is possible that only a small portion of the titanium compound forms a complex with the aluminum compound and the remainder acts as the promoter. In any case it is clear that most of the titanium compound may be recovered and reused. The aluminum compound, on the other hand, is consumed during the polymerization reaction.

The ratio of the aluminum compound to the titanium compound may be varied as desired. This is so because most, or all of the titanium compound may be recovered. Thus, if an excess of the titanium compound is employed all, or most of it, may be recovered. If an excess of the aluminum compound is used then longer uninterrupted operations may be conducted and the polymerization process is then limited by the capacity of the reaction vessel. In the preferred embodiment it is found to be advantageous to employ a molar ratio wherein there is an excess of the aluminum compound. This preference is based on the finding that products are obtained which have the most desirable molecular weight and have the greatest utility as molding compounds. The preferred ratios range from about 5:1 to about 100:1 with a ratio of about 35:1 to about 75:1 being most preferred.

As previously indicated, catalyst compositions of this invention are useful primarily for the polymerization of alpha-olefins. In the preferred embodiment it is particularly advantageous to employ the catalyst for the polymerization of ethylene, propylene, or mixtures thereof as the polymers are thus obtained in higher yields per unit of catalyst. The catalyst compositions of this invention may be suitably employed for the polymerization of other alpha-olefins such as butene-1, hexene-1, styrene, decene-1, octadecene-1, and the like.

It is a particularly outstanding advantage of this invention that the polymerization of alpha-olefins, employing the novel catalyst compositions, is efficiently conducted in simple apparatus. All that is required is that the alpha-olefins be contacted with the catalyst, in the hydrocarbon solvent, whereupon polymer of the particular alpha-olefin forms and precipitates. Various procedural techniques may be employed in order to hasten the polymerization and to obtain higher yields per unit of catalyst. Thus, for example, it is found to be particularly advantageous to employ a reactor having suitable means for agitating or mixing the olefin with the catalyst. Such mixing may be accomplished by the employment of an agitator or by the employment of a reaction vessel which is mounted on a rocker. Still another technique which is employed in order to obtain maximum efficiency requires that the various reactants, solvent, catalyst components, and the like, be as nearly free of impurities as possible, or practical. Thus, for example, it is found to be particularly advantageous to employ alpha-olefin which has been pretreated in order to remove impurities in the form of oxygen, water, acetylene, and the like. In a similar manner, the solvent should be free of deleterious impurities which is represented, for example, by small amounts of thiophene which may be present in a benzene solvent. While these precautionary measures may be employed in order to obtain higher yields and/or a more pure product, it will be observed that the process does not require as an absolute essential that impurities be entirely eliminated.

In conducting the polymerization of alpha-olefins, employing the novel catalysts of this invention, it is found to be particularly suitable to prepare the catalyst in the same reaction vessel which is to be employed for the polymerization reaction. This may be accomplished simply by charging the aluminum compound and the titanium compound into the reactor. The compounds are in solution or suspension depending on the nature of the hydrocarbon. It will be observed that a precipitate need not form from the catalyst components and the catalyst, and/or its components, may be contained in solution or suspension from the beginning. Thereafter all that is necessary is that the olefin be charged to the reactor whereupon polymerization will commence. An alternative method for conducting the polymerization comprises charging to the reaction vessel pre-prepared catalyst, contained in a hydrocarbon solvent, in which event a separate inlet leading to the polymerization vessel is required. This latter means of procedure is less preferred for batch operations as it is noted that the stability of the catalyst composition may be affected by an aging period which in turn yields a less uniform product. The pre-prepared catalyst is particularly preferred when the polymerization is to be conducted on a continuous scale. In that case, the pre-prepared catalyst permits greater uniformity of catalyst composition in that it is all aged for about the same time thereby giving greater uniformity in the polymerization product. In another alternative procedure the polymerization may be conducted with an initial charge of the catalyst and thereafter, while the polymerization is in progress, or after it has been in progress for sometime, an additional charge of the catalyst or one of its components will cause a pickup in the olefin absorption rate thereby affording higher yields per unit of catalyst. In such a case, however, it will be observed that the polymerization product does not have the uniformity obtained by other, and more preferred, methods of operation. Actually, the polymerization process employing the novel catalyst is capable of very wide modification not only in regard to details previously described but also in regard to temperatures and pressures, times for polymerization and the like. All these factors will, in some measure, affect yields, polymerization rates, molecular weight of the product and the like.

The polymerization processes are conducted at temperatures below 150° C. In the preferred embodiment, temperatures range from room temperature to about 60° C. The pressures may be widely varied from ambient pressures to 500 p.s.i. These and other embodiments of the invention are described in greater detail in the following examples.

*Example I*

This example illustrates a representative procedure for producing polyethylene under increasing pressure.

To a steel autoclave is charged a solution of 885 mg. of aluminum diethyl chloride in 22 gr. of isooctane. The resultant solution is then added to 35 mg. of dicyclopentadienyl titanium dichloride, while maintaining an inert atmosphere of nitrogen. The vessel is then blown through with nitrogen after which ethylene is pressured into the vessel at 30 atmospheres, absolute. The vessel, being mounted on rockers, is rocked at room temperature. After the pressure falls to 18 atmospheres ethylene is added up to a pressure of 42 atmospheres. After 4½ hours the pressure in the autoclave is 36 atmospheres so that the total pressure drop is 18 atmospheres. Thereafter the contents of the vessel are emptied by washing with ethanol and the slurry of the polymer is filtered. The polymer is washed with ethanol and dried at 100° C. There is obtained 15 grams of polyethylene and from the filtrate there is recovered about 27 mg. of the titanium compound by extraction with chloroform. The yield of polymer amounts to more than 1800 grams per gram of titanium compound.

*Example II*

Following the procedure of Example I there is obtained 16 grams of polymer having an intrinsic viscosity of 16. In this example there is employed 7.0 mg. of dicyclopentadienyl titanium dichloride to which is added 20 mls. of 0.144 molar aluminum diethyl chloride in isooctane. In this experiment the pressure drops from 27 to 5 atmospheres in 20 hours.

*Example III*

The catalyst is prepared by dissolving 5.0 mg. of the titanium compound in 100 ml. of thiophene-free benzene. To the solution thus obtained is added 4.5 ml. of 0.218 molar aluminum diethyl chloride in isooctane. The polymerization is carried out following the procedure of Example I except that the ethylene is maintained at atmospheric pressure and the temperature is about 30° C. The ethylene absorption rate is found to be about one-half liter per hour. There is obtained 1.5 grams of polymer after 3 hours. As in Example I, dicyclopentadienyl titanuim dichloride is recovered by extraction with chloroform.

*Example IV*

To a pressure vessel as in Example I is added a solution of 11.52 mmoles of the titanium compound and 259.8 mmoles of aluminum diethyl chloride in thiophene-free benzene. The solution is prepared at room temperature in an ethylene atmosphere. After a short mixing period the solution is diluted with more benzene to a final concentration of 5 mmoles of the titanium compound and 6.5 mmoles of the aluminum compound per liter. It is observed that upon the addition of the aluminum diethyl chloride to the solution of the titanium compound there occurs a color change from a red to a dark green but no precipitate forms. Following the procedure of Example I ethylene is then fed into the vessel, containing the above-prepared catalyst, at atmospheric pressure. Polymerization takes place rapidly at 40° C. during the first 10 minutes as indicated by a rapid absorption rate of the ethylene. Reaction is continued for 60 minutes but the ethylene absorption rate is not appreciable. After 75 minutes an additional 6.5 mmoles of aluminum diethyl chloride is added to the polymerization vessel whereupon the ethylene absorption increased as a consequence of the subsequent addition of the aluminum diethyl chloride. The mole ratio of the aluminum compound to the titanium compound is increased from 1.3 to 2.6. Polymerization is continued for an additional 205 minutes amounting to a total duration of 4⅔ hours. After the polymerization is complete the polymer is washed with 100 mls. of ethanol, filtered and washed again with ethanol followed by a washing with pentane. Thereafter the polymer is dried. There is obtained 9.0 grams of polyethylene having an intrinsic viscosity of 0.75. The filtrate, which is recovered from the washings, is treated with chloroform to extract 0.23 gram of dicyclopentadienyl titanium dichloride. Additionally, there is recovered about ½ gram of a wax having a melting point below 100° C.

Example V

The procedure of Example II is repeated except that the solution af aluminum diethyl chloride is diluted to 13 mmoles per liter and a second dose of the aluminum compound is not employed. Further, the duration of the run is 1¼ hours. There is obtained 11.6 grams of polyethylene having an intrinsic viscosity of 0.50.

Example VI

The exact procedure of Example V is repeated except that the polymerization is continued for two hours. Substantially the same results are obtained.

Example VII

In this example a low pressure Parr hydrogenation shaker is employed. It has a capacity of about 5 liters and under the conditions of operation a 15 pound pressure drop corresponds to 0.24 mole or 6.75 grams of ethylene ±10%. The shaker is flushed with nitrogen and the catalyst in cyclohexane is added to the vessel. The catalyst comprises 0.0137 gram of cyclopentadienyl titanium dichloride and 0.5 cc. of aluminum diethyl chloride in 100 cc. of cyclohexane. Ethylene is then pressured into the vessel and the polymerization reaction is conducted for a period of several hours. During the run the pressure ranges from about 20 to 50 p.s.i. Thereafter the polymer is worked up by filtering followed by washing in isopropyl alcohol containing a small amount of 1/N hydrochloric acid. Thereafter the polymer is filtered again and washed with water followed by rinsing with hexane and then dried. There is obtained 24 g. of polyethylene which amounts to over 1700 grams of polymer per gram of the titanium compound. It is noted that some of the titanium compound is present in the filtrate as indicated by a characteristic red color. The polyethylene thus obtained has a sharp melting point range of 135–140° C. and on melting gives a very clear film which is almost completely transparent.

Example VIII

The procedure of Example VII is repeated except that 0.0036 gram of dicyclopentadienyl titanium dichloride in 40 cc. of cyclohexane is employed together with 0.2 cc. of aluminum diethyl chloride. The vessel is pressured with 30 pounds of ethylene and only a slight change in ethylene pressure is observed. Thereafter 0.5 cc. of ethyl aluminum sesquihalide is added and upon shaking the ethylene pressure gradually drops. After working up and drying the polyethylene by the same procedure as in Example VII there is obtained 19 grams of polyethylene which amounts to 27,000 grams of polyethylene per gram of titanium.

Example IX

A catalyst composition prepared from aluminum diethyl chloride and diphenyl dicyclopentadienyl titanium is prepared in cyclohexane. The catalyst thus prepared is employed to polymerize ethylene. It is found that the ethylene absorption rate is not as rapid as in the above examples but after several hours there is obtained suitable yields of polyethylene which is produced as a precipitate.

Example X

The procedure of Example I is repeated except that a molar equivalent of aluminum triethyl replaces the aluminum diethyl chloride. Substantially the same results are obtained.

Example XI

Several experiments were conducted in order to determine the effect of varying the aluminum compound in the catalyst composition. It is found that no substantial differences are obtained when the aluminum alkyl is varied between the aluminum dialkyl halides and the aluminum trialkyls except that where the aluminum trialkyls and aluminum alkyl halides have more than 10 carbon atoms the polymerization rates are substantially lower with optimum results being obtained when the alkyl radicals have up to 4 carbon atoms.

Example XII

The procedure of Example I is repeated except that propylene is employed instead of ethylene. There is obtained white polypropylene which is observed to be relatively free of titanium residues.

Example XIII

Employing the same procedures styrene is polymerized with a catalyst prepared from aluminum trisobutyl and diphenyl dicyclopentadienyltitanium. In this example the styrene and the catalyst are agitated in a closed vessel at temperatures of about 40° C. The polymer thus obtained is similarly free of titanium residues.

Example XIV

The procedure of Example I is repeated except that the catalyst is prepared from equimolar portions of aluminum diisobutyl bromide and titanium dicyclopentadienyl dichloride. Similar results are obtained.

The polymers produced by this invention are characterized by a high degree of purity. This will be recognized by persons skilled in this art as a substantial improvement of prior low pressure methods of polymerization of alpha-olefins. In those methods the polymer required extensive treatment in order to remove the catalyst residue. Further, the polymers produced by the present invention will be found to have rather sharp melting points thus further emphasizing the advantages obtained by the instant invention.

The polymerization methods of this invention are capable of a number of modifications which are known in the low pressure polymerization art. Thus, for example, the polymer may be advantageously washed with dilute solutions of mineral acid in order to remove catalyst residues. If desired, the polymerization may be conducted in the presence of other organo-aluminum compounds as is illustrated in Example VIII. Alternatively, additional catalysts may be added after the polymerization reaction has been going for a while. This has the effect of increasing the absorption rate. Further, it may be found to be advantageous to employ an inert carrier for the catalyst. By this means greater catalyst life is experienced. Still other modifications which are known in the art may be undertaken without departing from the spirit of the invention.

I claim as my invention:

1. A composition which comprises the reaction product of an aluminum alkyl and diphenyl bis(cyclopentadienyl)titanium, the alkyl radical of the said aluminum alkyl having from 1 to 10 carbon atoms.

2. A composition which comprises the reaction product of diphenyl bis(cyclopentadienyl)titanium and an aluminum alkyl selected from the group consisting of aluminum trialkyl and aluminum dialkyl halide, the alkyl radical of the said aluminum alkyl having from 1 to 10 carbon atoms.

3. The composition of claim 2 in which the aluminum compound is aluminum diethyl chloride.

4. The composition of claim 2 in which the aluminum compound is aluminum triethyl.

5. The composition of claim 2 in which the aluminum compound is aluminum triisobutyl.

6. The composition of claim 2 in which the aluminum compound is aluminum diisobutyl bromide.

7. A polymerization catalyst which comprises the reaction product of an aluminum alkyl and diphenyl bis(cyclopentadienyl)titanium, the alkyl radical of the said aluminum alkyl having from 1 to 10 carbon atoms.

8. In the process for the polymerization of alpha-olefins having one polymerizable $>C=CH_2$ group at temperatures below 150° C. and pressures below 500 p.s.i., the improvement which comprises conducting the polymerization in contact with a catalyst comprising the reaction product of an aluminum alkyl and diphenyl bis(cyclopentadienyl)titanium, the alkyl radical of the said aluminum alkyl having from 1 to 10 carbon atoms.

9. In the process for the polymerization of alpha-olefins having one polymerizable >C=CH$_2$ group at temperatures below 150° C. and pressures below 500 p.s.i., the improvement which comprises conducting the polymerization in contact with a catalyst comprising the reaction product of diphenyl bis(cyclopentadienyl)titanium and an aluminum alkyl compound selected from the group consisting of aluminum trialkyls and aluminum dialkyl halides, the alkyl radical of the said aluminum alkyl having from 1 to 10 carbon atoms.

10. The process of claim 9 in which the aluminum compound is aluminum diethyl chloride.

11. The process of claim 9 in which the aluminum compound is aluminum triethyl.

12. The process of claim 9 in which the aluminum compound is aluminum triisobutyl.

13. The process of claim 9 in which the alpha-olefin is ethylene.

14. The process of claim 9 in which the alpha-olefin is propylene.

15. The process of claim 9 in which the alpha-olefin is styrene.

16. The process for the polymerization of ethylene at temperatures below 150° C. and pressures below 500 p.s.i., the improvement which comprises conducting the polymerization in contact with a catalyst comprising the reaction product of diphenyl bis(cyclopentadienyl)titanium and aluminum diethyl chloride, the mole ratio of Al:Ti ranging from about 5:1 to about 100:1.

References Cited in the file of this patent
UNITED STATES PATENTS
2,827,446   Breslow _____ Mar. 19, 1958